United States Patent [19]

Funt et al.

[11] Patent Number: 4,992,963
[45] Date of Patent: Feb. 12, 1991

[54] METHOD AND APPARATUS FOR DETERMINING AMBIENT LIGHT AND SURFACE REFLECTANCE

[75] Inventors: Brian V. Funt, West Vancouver; Jian Ho, Nepean; Mark S. Drew, Vancouver, all of Canada

[73] Assignee: Simon Fraser University, Burnaby, Canada

[21] Appl. No.: 279,168

[22] Filed: Dec. 2, 1988

[51] Int. Cl.$^5$ .................. G06F 15/62; G01J 3/50; G01N 21/55

[52] U.S. Cl. .................. 364/526; 250/226; 356/402; 364/521

[58] Field of Search .................. 364/581, 526, 576; 250/226; 356/402, 404–406; 358/22, 75, 81; 382/17

[56] References Cited

U.S. PATENT DOCUMENTS

| | | | |
|---|---|---|---|
| 4,623,973 | 11/1986 | Hoffrichter et al. | 364/526 |
| 4,648,051 | 3/1987 | Wandell et al. | 364/526 |
| 4,653,925 | 3/1987 | Thornton, Jr. | 364/526 |
| 4,750,140 | 6/1988 | Asano et al. | 364/526 |
| 4,797,738 | 1/1989 | Kashi et al. | 364/526 |
| 4,809,194 | 2/1989 | Crookshanks | 364/581 |

OTHER PUBLICATIONS

Yuille, A. (1987), A Method for Computing Spectral Reflectance Biological Cybernetics, 56, pp. 195–201.

Brian V. Funt and Mark S. Drew, "Color Constancy Computation in Near-Mondrian Scenes Using a Finite Dimensional Linear Model".

Brian A. Wandell, "The Synthesis and Analysis of Color Images", IEE Transactions on Pattern Analysis and Machine Intelligence, vol. PAMI-9, No. 1, Jan. 1987, pp. 2–13.

Laurence T. Maloney and Brian Al Wandell, "Color Constancy: A Method for Recovering Surface Spectral Reflectance", J. Opt. Soc. Am. A/vol. 3, No. 1/Jan. 1986, pp. 29–33.

Primary Examiner—Felix D. Gruber
Attorney, Agent, or Firm—Shlesinger & Myers

[57] ABSTRACT

An apparatus for dividing light reflected by an illuminated surface into constituent parts of illuminating light and surface spectral reflectance of the surface. The apparatus includes a receiving device for receiving signals representing measured spectral power distribution Im($\lambda$) of the light reflected by the illuminated surface. The apparatus generates a weighting coefficient $\epsilon_i$ for each of M illuminant basis functions $EB_i(\lambda)$ for describing the illuminating light. Weighting coefficients $\sigma_j$ for each of N reflectance basis functions $Sb_j(\lambda)$ are generated to describe the reflectance of the surface. The apparatus compares an approximation Ia($\lambda$) of the measured spectral power distribution Im($\lambda$), Ia($\lambda$) being defined by the relation:

$$Ia(\lambda) = \left(\sum_{i=1}^{M} \epsilon_i Eb_i(\lambda)\right)\left(\sum_{j=1}^{N} \sigma_j Sb_j(\lambda)\right)$$

where the set of product pairs $Eb_i(\lambda)Sb_j(\lambda)$ is linearly independent.

Different weighting coefficients are regenerated until said Ia($\lambda$) and said Im($\lambda$) are generally equal. Signals representing at least one of the constituent parts of illuminating light and said surface spectral reflectance are generated based on the weighting coefficients $\sigma_i$ and $\sigma_j$ which make said Ia($\lambda$) generally equal to said Im($\lambda$). The apparatus has an output device for outputting the signals.

27 Claims, 7 Drawing Sheets

METHOD AND APPARATUS FOR DETERMINING AMBIENT LIGHT AND SURFACE REFLECTANCE

BACKGROUND OF THE INVENTION

Field of the Invention

The invention relates to a method and apparatus for determining ambient light and surface spectral reflectance from light reflected by a surface.

When light from an illuminating light source impinges upon a surface, a reflected beam of light is produced. The illuminating light has a characteristic spectral power distribution and the surface has a characteristic spectral reflectance. The light reflected by the surface has a spectral content determined by the spectral power distribution of the illuminating light and the spectral reflectance of the surface.

The human eye and brain have the ability to determine the colour of the surface merely by viewing the light reflected from it. In fact, this perceptual ability is such that the colour of the surface can be determined under a variety of lighting conditions. The human eye perceives the surface as the same colour under different ambient lighting conditions. In the fields of computer vision, colour television, photography, etc. it is desirable to produce this same perceptual ability in non-human devices.

U.S. Pat. No. 4,648,051 to Wandell et al. discloses a system which includes a number of sensors and a computer programmed to analyze light reflected by a surface. The computer produces approximations of the illuminating light and of the surface spectral reflectance of the surface. Such approximations involve a number of degrees of freedom or variables to describe the illuminating light or surface reflectance. Wandell requires that there be at least as many sensor classes as there are degrees of freedom in the ambient light approximation and requires that there be more classes of sensors than degrees of freedom in the surface reflectance approximation. In addition, the Wandell device requires that the illuminating light be constant everywhere on the surface, requires viewing a plurality of locations on the surface and requires that there be a significant variation of the colour of the surface within a small region thereon.

The invention disclosed herein views the surface at only one point to determine an estimate of surface spectral reflectance for that point and to determine an estimate of the illuminating light impinging upon the point. Thus, the surface spectral reflectance of each point on the surface can be determined individually and because each point is viewed individually, the apparatus does not require that there be a significant variation in the surface colour within a small region on the surface and does not require that the illumination of the surface remain generally constant over areas of the surface.

SUMMARY OF THE INVENTION

According to the invention, an apparatus for dividing light reflected by an illuminated surface into constituent parts of illuminating light and surface spectral reflectance of the surface comprises receiving means for receiving signals representing measured spectral power distribution $Im(\lambda)$ of the light reflected by the illuminated surface. The apparatus generates a weighting coefficient $\epsilon_i$ for each of M illuminant basis functions $Ebi(\lambda)$ for describing illuminating light weighting coefficients $\sigma_j$ for each of N reflectance basis functions $Sbj(\lambda)$ are generated to describe the reflectance of the surface The apparatus compares an approximation $Ia(\lambda)$ of the measured spectral power distribution $Im(\lambda)$, $Ia(\lambda)$ being defined by the relation:

$$Ia(\lambda) = \left(\sum_{i=1}^{M} \epsilon_i Eb_i(\lambda)\right)\left(\sum_{j=1}^{N} \sigma_j Sb_j(\lambda)\right)$$

where the set of product pairs $Ebi(\lambda)Sbj(\lambda)$ is linearly independent.

Different weighting coefficients are regenerated until said $Ia(\lambda)$ and said $Im(\lambda)$ are generally equal. Signals representing at least one of the constituent parts of illuminating light and said surface spectral reflectance are generated based on the weighting coefficients $\epsilon_i$ and $\sigma_j$ generated to make said $Ia(\lambda)$ generally equal to said $Im(\lambda)$. The apparatus has an output device for outputting the signals.

BRIEF DESCRIPTION OF THE DRAWINGS

FIG. 7b is a continuation of the flowchart of FIG. 7a; and

DESCRIPTION OF THE PREFERRED EMBODIMENT

Figure 1:
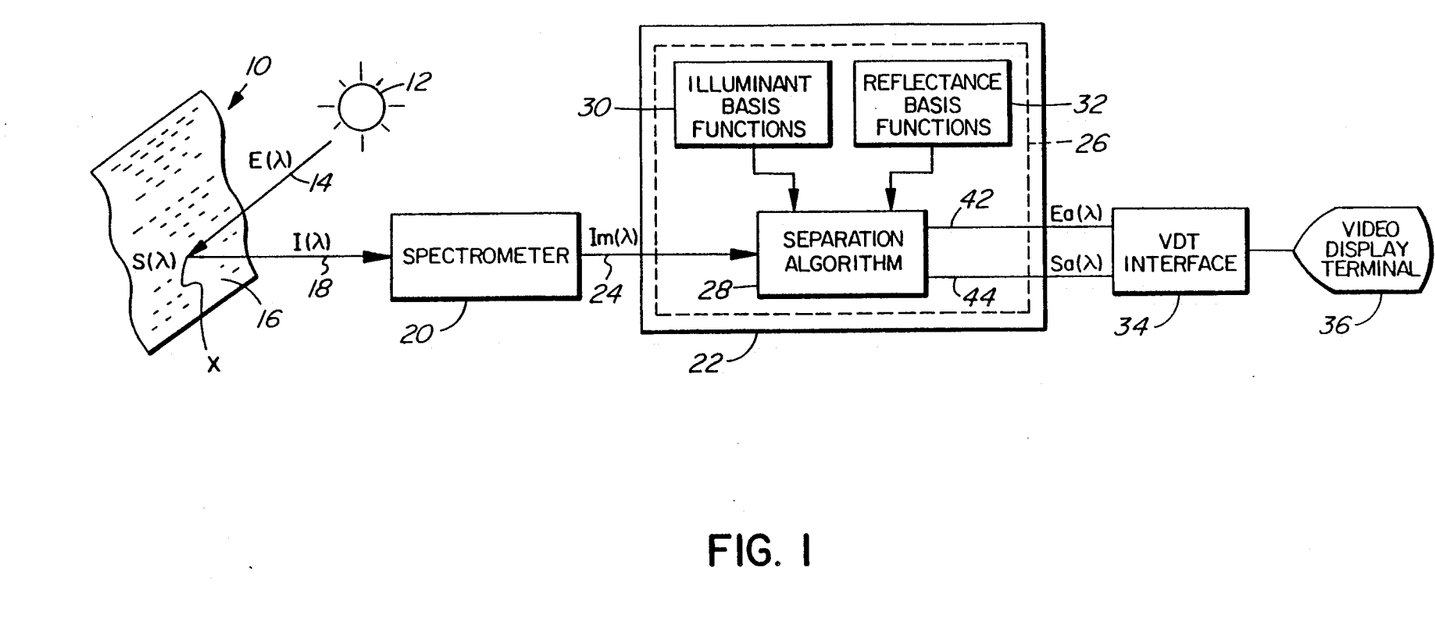
FIG. 1 is a simplified block diagram of an apparatus according to a first embodiment of the invention.
Figure 2:
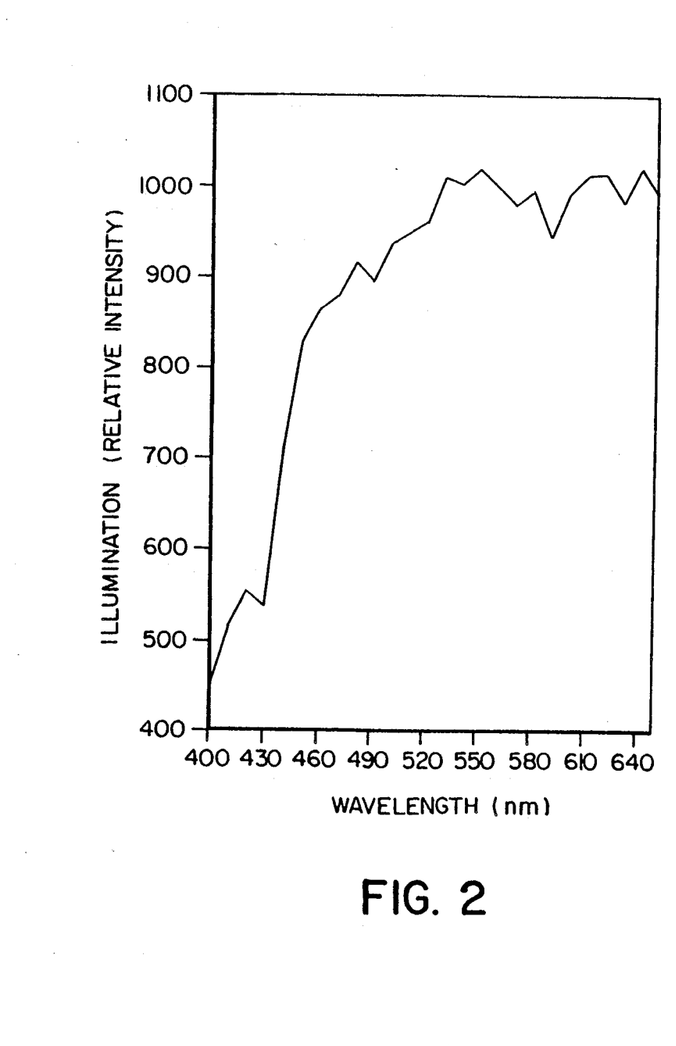
FIG. 2 is a graph of the spectral power distribution of daylight.

Referring to FIG. 1 a scene 10 has a light source 12 emitting illuminating light 14 onto a surface 16. The light striking the surface has a spectral power distribution $E(\lambda)$ which defines the relative intensity of light at a plurality of wavelengths in the visible spectrum. In this embodiment, the light source 12 is daylight having a spectral power distribution as indicated in FIG. 2. Alternatively the light source may be a candle, tungsten light, black body radiator, other artificial or natural light source, or a combination of any of these.

Referring back to FIG. 1, illuminating light 14 strikes a point x on the surface 16. The surface, at point x, reflects the illuminating light to produce reflected light 18. The illuminating light 14 is not necessarily constant over the entire scene, therefore each point in the scene can receive illuminating light having a different spectral power distribution. The surface 16 is assumed to be opaque and matt and therefore the reflected light 18 at point x can be described in terms of a fraction of the illuminating light impinging upon point x. The surface does not reflect all wavelengths of light 14 in the same proportions and therefore individual fractional values representing the ratio of illuminating light 14 to reflected light 18 must be specified for each wavelength of light impinging upon the surface. The collection of all of the individual fractional values specifies the surface spectral reflectance S(λ) of the surface at point x. Each point on the surface may have a different spectral reflectance.

Figure 3:
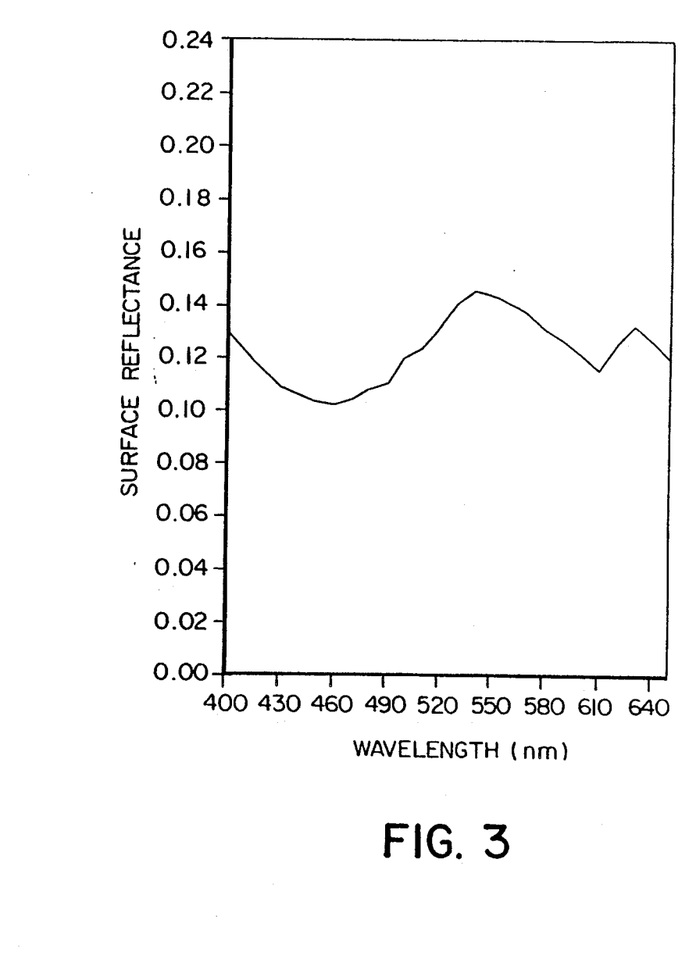
FIG. 3 is a graph of the surface spectral reflectance of a river valley with meadows.

In this example, the surface 16 is a river valley with meadows. The spectral reflectance of this surface has been previously measured and is described by Krinov in Technical Translation TT439 of the National Research Council of Canada 1947 incorporated herein by reference. The spectral reflectance of this surface is repeated here in FIG. 3.

Figure 4:
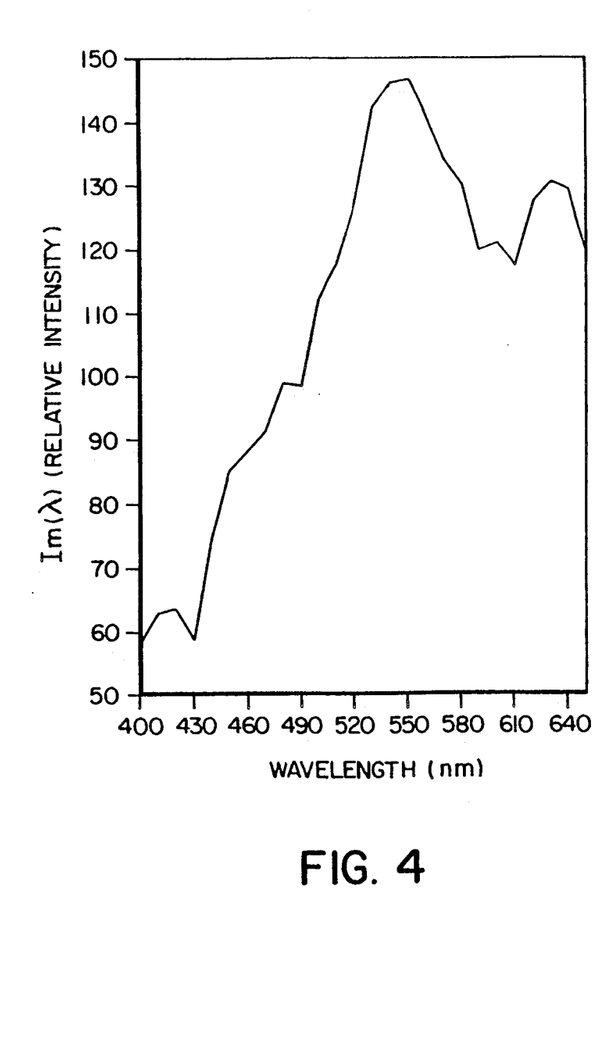
FIG. 4 is a graph of the measured spectral power distribution of the light reflected by said surface.

Referring back to FIG. 1, the reflected light 18 from point x is received by a spectrometer 20. The spectrometer performs a bandlimited spectral analysis of the reflected light 18 to produce a spectral power distribution Im(λ) as shown in FIG. 4. The spectrometer represents the spectral power distribution Im(λ) of reflected light as a plurality of light intensity samples taken at L wavelengths. This is shown at task 208 in FIG. 7a. Referring back to FIG. 1, the samples are communicated to a computer 22 by signal wires 24 such as found in a serial communication link. Task 206 of FIG. 7a represents the receipt of these communicated samples.

As will become apparent below, the number of light intensity samples must be at least as many as the sum of the number of basis functions used to approximate the illuminating light component plus the number of basis functions used to approximate the surface spectral reflectance component.

The computer 22 in this example is a SUN-2 workstation running a 4.2BSD Unix operating system. An applications program shown in broken outline at 26, for performing a separation algorithm 28 is written in the C programming language and runs in conjunction with the Unix operating system. The computer 22 acts to provide first programmable means. The computer 22, operating system and applications program 26 cooperate to implement the separation algorithm 28. Alternatively, the computer 22 and software may be replaced by a hardwired electronic circuit or an analog computer.

Figure 7A:
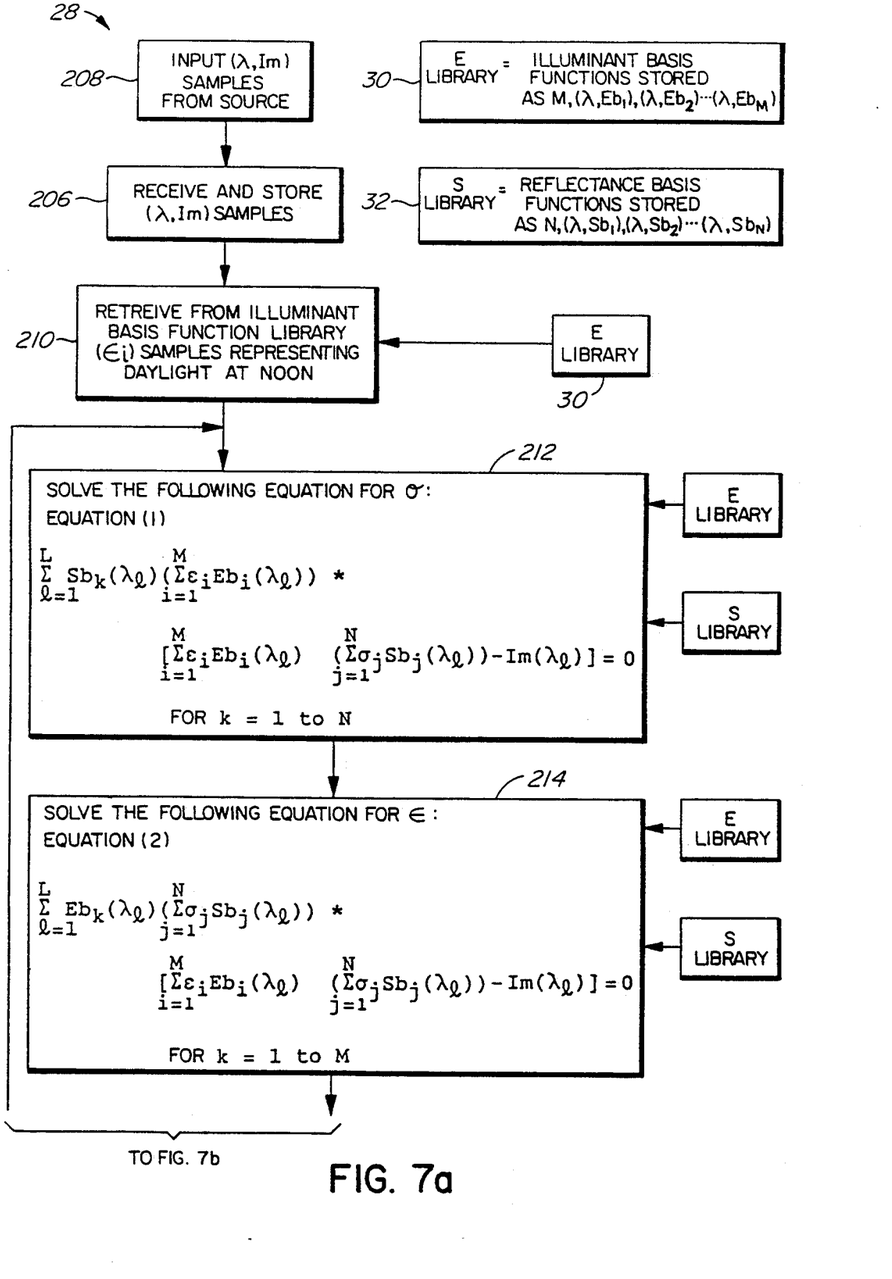
FIG. 7a is a simplified flowchart of a separation algorithm according to the first embodiment of the invention.
Figure 7B:
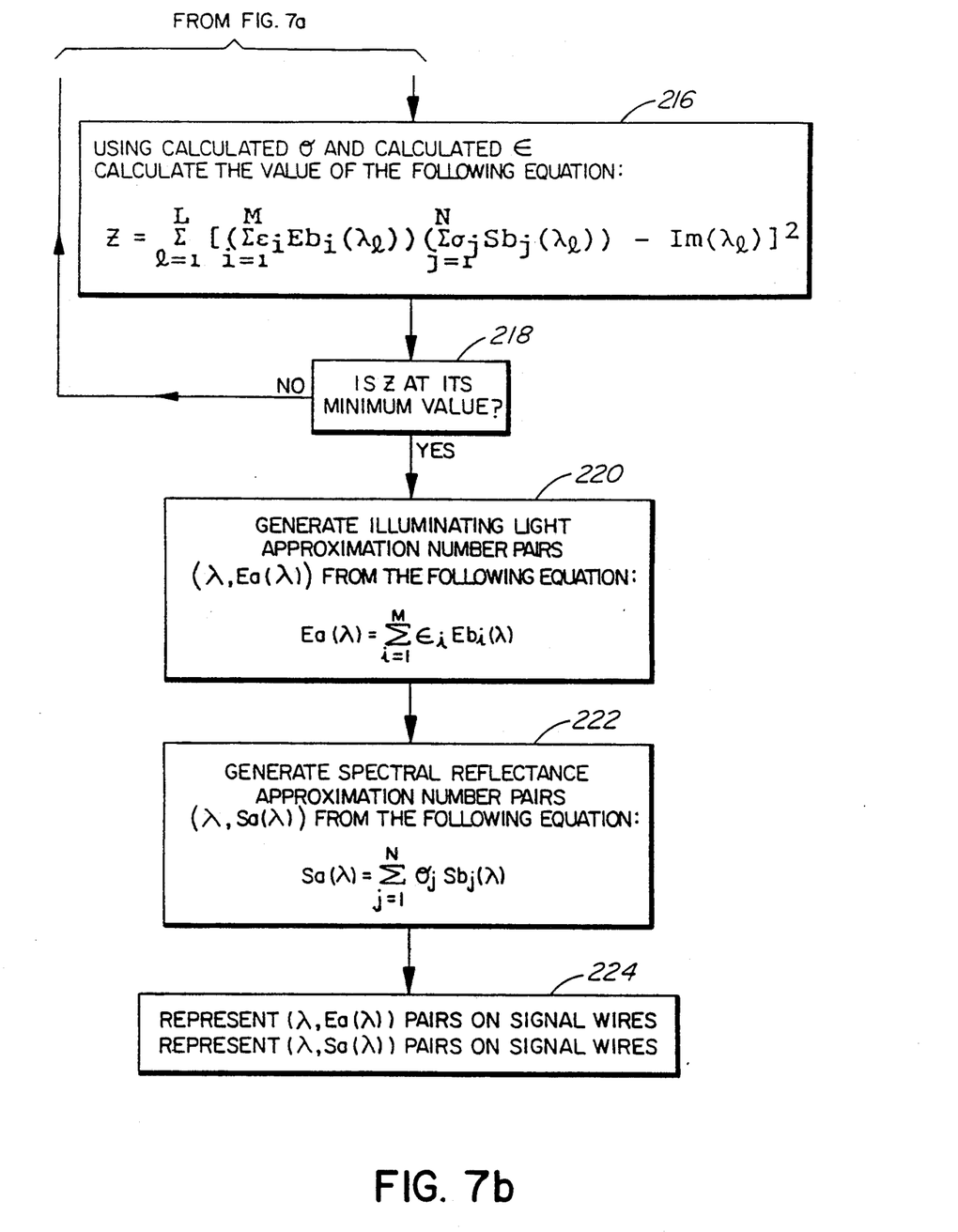

Referring to FIGS. 1, 7a and 7b the applications program 26 includes a library 30 of illuminant basis functions and a library 32 of reflectance basis functions. The library 30 includes a plurality of illuminant basis functions $Eb_i(\lambda)$ which are used in weighted proportions to represent an approximation to the spectral power distribution of the illuminating light 14 emitted by the light source 12. This approximation is represented as a weighted sum of the illuminant basis functions according to the equation:

$$Ea(\lambda) = \sum_{i=1}^{M} \epsilon_i Eb_i(\lambda)$$

where:
Ea(λ) is an approximation to the spectral power distribution of the illuminating light
$\epsilon_i$ is a weighting coefficient for the ith basis function,
$Eb_i(\lambda)$ is the ith basis function for representing illuminating light,
M is the number of illuminant basis functions used.
The above equation allows the illuminating light to be characterized by an illumination vector of weights:

$$\epsilon = (\epsilon_1, \epsilon_2, \epsilon_3, \ldots \epsilon_M)$$

The illuminant basis functions $Eb_i(\lambda)$ in this embodiment are given by Judd, Deane B., MacAdam, David L. and Wyszecki, Gunter in an article entitled "Spectral Distribution of Typical Daylight as a Function of Correlated Colour Temperature" appearing in the Journal of the Optical Society America 54(8): 1031-1040, August 1964, incorporated herein by reference. Alternatively, the illuminant basis functions $Eb_i(\lambda)$ may be Fourier basis functions.

The library 32 of reflectance basis functions includes a plurality of reflectance basis functions Sbj(λ) which can be used in weighted proportions to represent an approximation to the surface spectral reflectance of a point on the surface such as point x. This approximation is represented as a weighted sum of reflectance basis functions according to the equation:

$$Sa(\lambda) = \sum_{j=1}^{N} \sigma_j Sb_j(\lambda)$$

where:
Sa(λ) is an approximation to the surface spectral reflectance of a point on the surface,
σj is a weighting coefficient for the jth basis function,
$Sb_j(\lambda)$ is the jth basis function for representing the surface spectral reflectance,
N is the number of reflectance basis functions used.
The above equation allows the spectral reflectance to be characterized by a surface reflectance vector of weights:

$$\sigma = (\sigma_1, \sigma_2, \sigma_3, \ldots \sigma_N)$$

The reflectance basis functions Sbj(λ) in this embodiment are given by Cohen, J., in Dependency of The Spectral Reflectance Curves of The Munsell Color Chips, Psychon. Sci. 1:369-370, 1964, incorporated herein by reference. Alternatively, the spectral reflectance basis functions Sbj(λ) may be Fourier basis functions.

The two approximations Ea(λ) and Sa(λ) are multiplied together to arrive at an approximation Ia(λ) to the spectral power distribution of the reflected light according to the equation:

$$Ia(\lambda) = Ea(\lambda) Sa(\lambda)$$

$$\begin{aligned}Ia(\lambda) &= Ea(\lambda)Sa(\lambda) \\ &= \left(\sum_{i=1}^{M} \epsilon_i Eb_i(\lambda)\right)\left(\sum_{j=1}^{N} \sigma_j Sb_j(\lambda)\right)\end{aligned}$$

The equation produces a set of product pairs $Eb_i(\lambda)Sb_j(\lambda)$ which must be linearly independent.

At task 214 in FIG. 7a, the program 26 acts to generate a weighting coeffecient $\epsilon_i$ for each of M illuminant basis functions $Eb_i(\lambda)$ for describing the illuminating light 14. The use of M illuminant basis functions requires that the program generate M respective illuminant weighting coefficients.

Thus, the illumination vector of weights $\epsilon = (\epsilon_1, \epsilon_2, \epsilon_3, \ldots \epsilon_M)$ has M components. The number M of basis functions required to describe the illuminating light 14 depends upon the desired accuracy of the approximation $Ea(\lambda)$. Statistical analysis of illumination measurements provides as many basis functions as desired. An adequate approximation $Ea(\lambda)$ is obtained using four or five illuminant basis functions. The Judd reference listed above provides up to five (i.e. M=5) illuminant basis functions which have been found to provide reasonable approximations to the illuminating light in most outdoor scenes.

At task 212, the program 26 also acts to generate a weighting coefficient $\sigma_j$ for each of N reflectance basis functions $Sbj(\lambda)$ for describing the reflectance of a point on the surface 16. The use of N reflectance basis functions requires that the program generate N respective surface reflectance weighting coefficents. Thus, the surface reflectance vector of weights $\sigma = (\alpha_1, \sigma_2, \sigma_3, \ldots \sigma_N)$ has N components. Statistical analysis of surface reflectance measurements provides as many basis functions as desired. An adequate approximation $Sa(\lambda)$ is obtained using four to seven reflectance basis functions. The Cohen reference above provides up to four (N=4) reflectance basis functions which have been found to provide reasonable approximations to the surface reflectance of many surfaces.

The program 26 generates the illumination vector of weights $\epsilon$ and the surface reflectance vector of weights $\sigma$ according to equations (1) and (2) below, the equations being derived using the calculus of variations:

$$\sum_{l=1}^{L} Sb_k(\lambda_l) \left( \sum_{i=1}^{M} \epsilon_i Eb_i(\lambda_l) \right) \cdot \left[ \left( \sum_{i=1}^{M} \epsilon_i Eb_i(\lambda_l) \right) \left( \sum_{j=1}^{N} \sigma_j Sb_j(\lambda_l) \right) - Im(\lambda_l) \right] = 0 \quad \text{EQUATION (1)}$$

for $k = 1$ to $N$ $$\sum_{l=1}^{L} Eb_k(\lambda_l) \left( \sum_{j=1}^{N} \sigma_j Sb_j(\lambda_l) \right) \cdot \left[ \left( \sum_{i=1}^{M} \epsilon_i Eb_i(\lambda_l) \right) \left( \sum_{j=1}^{N} \sigma_j Sb_j(\lambda_l) \right) - Im(\lambda_l) \right] = 0 \quad \text{EQUATION (2)}$$

for $k = 1$ to $M$

Referring to FIGS. 7a and 7b to begin solving the equations for $\epsilon$ and $\sigma$, task 210 of the program 26 generates a first illumination vector of weights assuming the illuminating light is of a standard type such as daylight at noon. At task 212, this first illumination vector of weights is then used in equation 1 to solve for a first surface reflectance vector of weights. This can be accomplished by standard methods since equation 1 is linear in $\sigma j$. Upon obtaining values for the first surface reflectance vector of weights, at task 214, these values are then used in equation 2 to obtain a second illumination vector of weights. This second illumination vector is then used in equation 1 to produce a second surface reflectance vector. This second surface reflectance vector is then used in equation 2 to produce a third illumination vector and so on. The alternate solving of equations 1 and 2 is an iterative process which is carried out until the generated illumination vectors converge and the generated surface reflectance vectors also converge. The value to which the illumination vector converges defines the resultant illumination vector and the value to which the surface reflectance vector converges defines the resultant surface reflectance vector of point x on the surface 16.

The effect of the above two equations is to employ the least squares method to derive an appropriate illumination vector and an appropriate surface reflectance vector such that the approximation $Ia(\lambda)$ is fitted closely to within acceptable limits of the measured $Im(\lambda)$. In effect, the illumination vector and the surface reflectance vector are selected such that the following mathematical relation is a minimum:

$$\sum_{l=1}^{L} \left[ \left( \sum_{i=1}^{M} \epsilon_i Eb_i(\lambda_l) \right) \left( \sum_{j=1}^{N} \sigma_j Sb_j(\lambda_l) \right) - Im(\lambda_l) \right]^2$$

or $$\sum_{l=1}^{L} [Ea(\lambda_l) Sa(\lambda_l) - Im(\lambda_l)]^2$$

or $$\sum_{l=1}^{L} [Ia(\lambda_l)) - Im(\lambda_l)]^2$$

As exemplified in tasks 216 and 218, the illumination vector and the surface reflectance vector are iteratively recalculated until the approximation $Ia(\lambda)$ is such that the above expression is a minimum. The illumination vector components and the reflectance vector components which make the above equation take on its minimum value are the illumination and surface reflectance vectors which best define the illuminating light 14 and the surface reflectance of the point x on the surface 16.

Upon generating the resultant illumination vector $\epsilon$ and the resultant surface reflectance vector $\sigma$, the approximation to the illuminating light $Ea(\lambda)$ and the approximation to the surface spectral reflectance $Sa(\lambda)$ are produced with task 220 and 222 according to the equations:

$$Ea(\lambda) = \sum_{i=1}^{M} \epsilon_i Eb_i(\lambda)$$

where:
$Ea(\lambda)$ is an approximation to the spectral power distribution of the illuminating light
$\epsilon_i$ is a weighting coefficient for the ith basis function, the weighting coefficient being from the generated illumination vector of weights,
$Eb_i(\lambda)$ is the ith basis function for representing illuminating light.
M is the number of illuminant basis functions used.

$$Sa(\lambda) = \sum_{j=1}^{N} \sigma_j Sb_j(\lambda)$$

where:
$Sa(\lambda)$ is an approximation to the surface spectral reflectance of a point on the surface,
$\sigma j$ is a weighting coefficient for the jth basis function, the weighting coefficient being from the generated illumination vector of weights,
$Sbj(\lambda)$ is the jth basis function for representing the surface spectral reflectance,
N is the number of reflectance basis functions used.

The program represents the illuminating light approximation $Ea(\lambda)$ as a plurality of light intensity samples taken at a plurality of wavelengths. Similarly, the program represents the surface reflectance approximation as a plurality of reflectance samples taken at a plurality of wavelengths. The samples are represented as electrical signals on wires 42 and 44 as exemplified by task 224. The signals are supplied to an interface 34 for a video display terminal 36 as shown in FIG. 1. Alternatively the electrical signals may be supplied to an interface (not shown) for transmission over a communications channel, or for providing a general connection point to wires 42 and 44.

Alternatively, the signals may be used in further processing steps performed by the computer. For instance, the reflectance samples for the scene may be processed by the computer using conventional techniques of color science to compute Committee Internationale d'Eclairage (CIE) color tri-stimulus coordinates. These coordinates may be used to provide signals for accurately displaying the scene on a wide variety of color display media, printing devices or systems.

The apparatus may also be used to develop signals for implementing a color filter. In this application, the illumination constituent is found at a few selected points in the scene and interpolation methods are used to find the illumination constituent at points therebetween. Consequently, the illumination constituent need not necessarily be calculated at each point in the scene and therefore computation time can be reduced. Using this approach, the illumination constituent need only be repeatedly used in the first iterative process equation to find the surface reflectance vector and hence the surface relectance at each point in the scene. Upon determining the surface reflectance constituent at each point, correction signals for implementing the color filter may be produced using conventional techniques.

Figure 5:
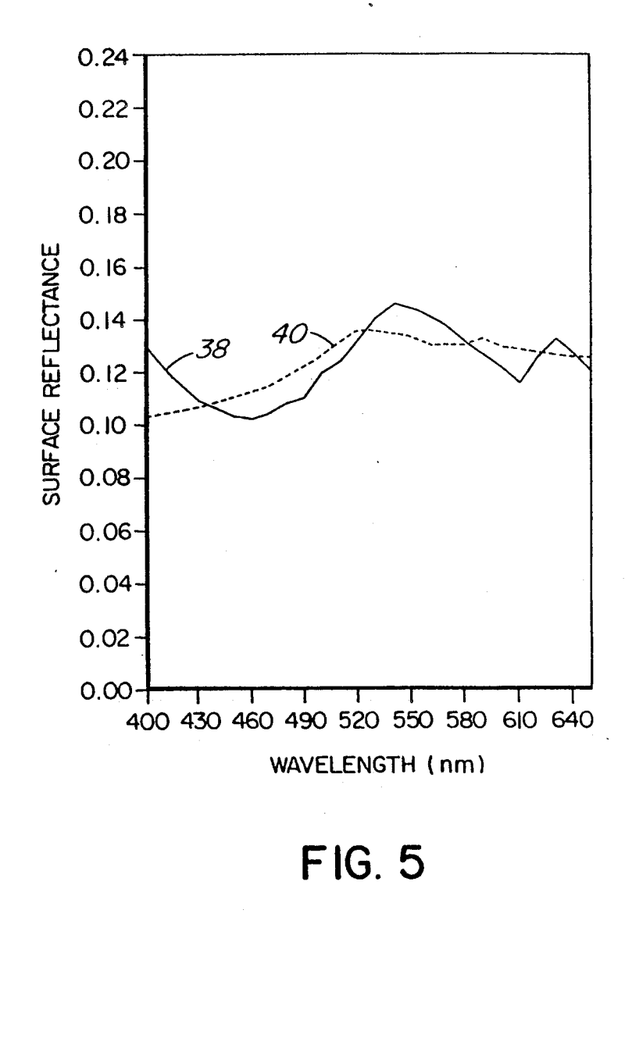
FIG. 5 is a graph of measured and approximated surface spectral reflectance produced by the apparatus of FIG. 1.

Referring to FIG. 5, a plurality of reflectance samples are displayed in graphical form. The actual surface reflectance of the surface is indicated by the solid line 38. The approximation to the surface reflectance obtained through the use of the iterative process described earlier is indicated by the broken line 40.

Figure 6:
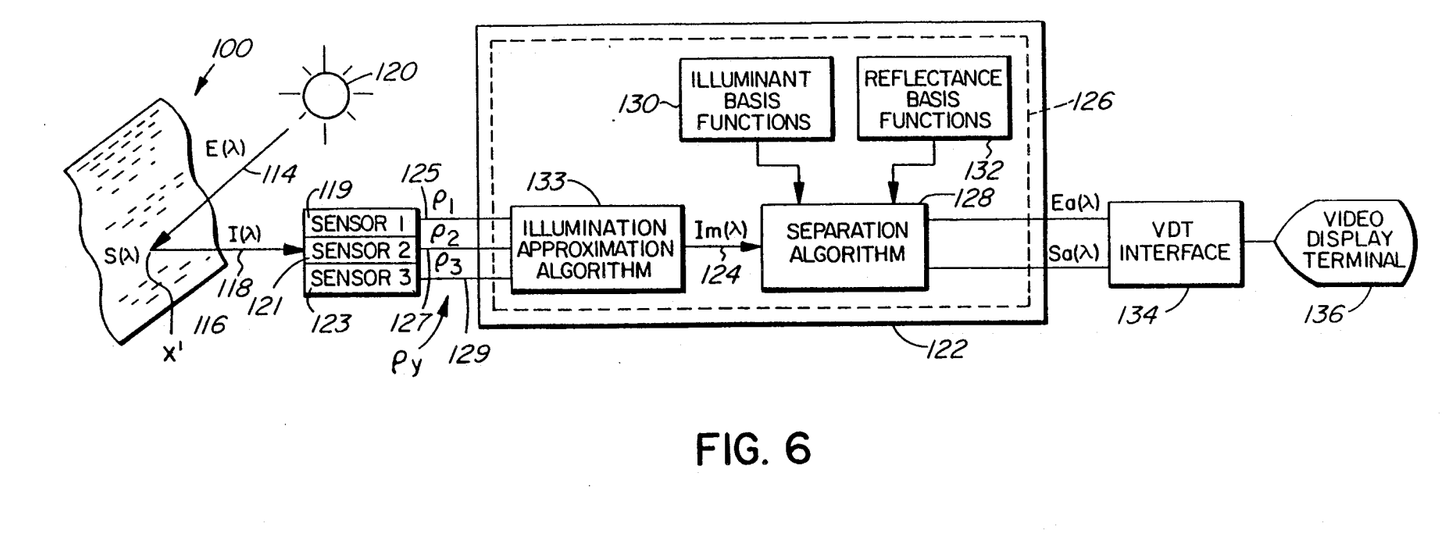
FIG. 6 is a simplified block diagram of an apparatus according to a second embodiment of the invention.

Referring to FIG. 6, a second embodiment of the invention is shown. In general, the second embodiment replaces the spectrometer of the first embodiment with a plurality of Y sensors for receiving light reflected by the illuminated surface and includes an illumination approximation algorithm 133 incorporated into an applications program 126. The scene and elements of the second embodiment are similar to corresponding items of the first embodiment. Items of the second embodiment which correspond to items of the first embodiment are indicated by the addition of 100 to numerical references of the first embodiment.

The reflected light 118 from point x is received by sensors, in this case by first, second and third sensors 119, 121 and 123 respectively. Each sensor has a respective spectral sensitivity and produces a respective sensor signal $\rho y$ responsive to the intensity and the spectral content of the light received at the sensor. The spectral sensitivity of any individual sensor is specified by the relation:

$$\rho y = \int R_y(\lambda) \, I(\lambda) \, d\lambda$$

where:
$R_y(\lambda)$ is the spectral sensitivity of the yth sensor as a function of $\lambda$; and $I(\lambda)$ is the intensity of the light reflected by the illuminated surface as a function of $\lambda$.

Figure 8:
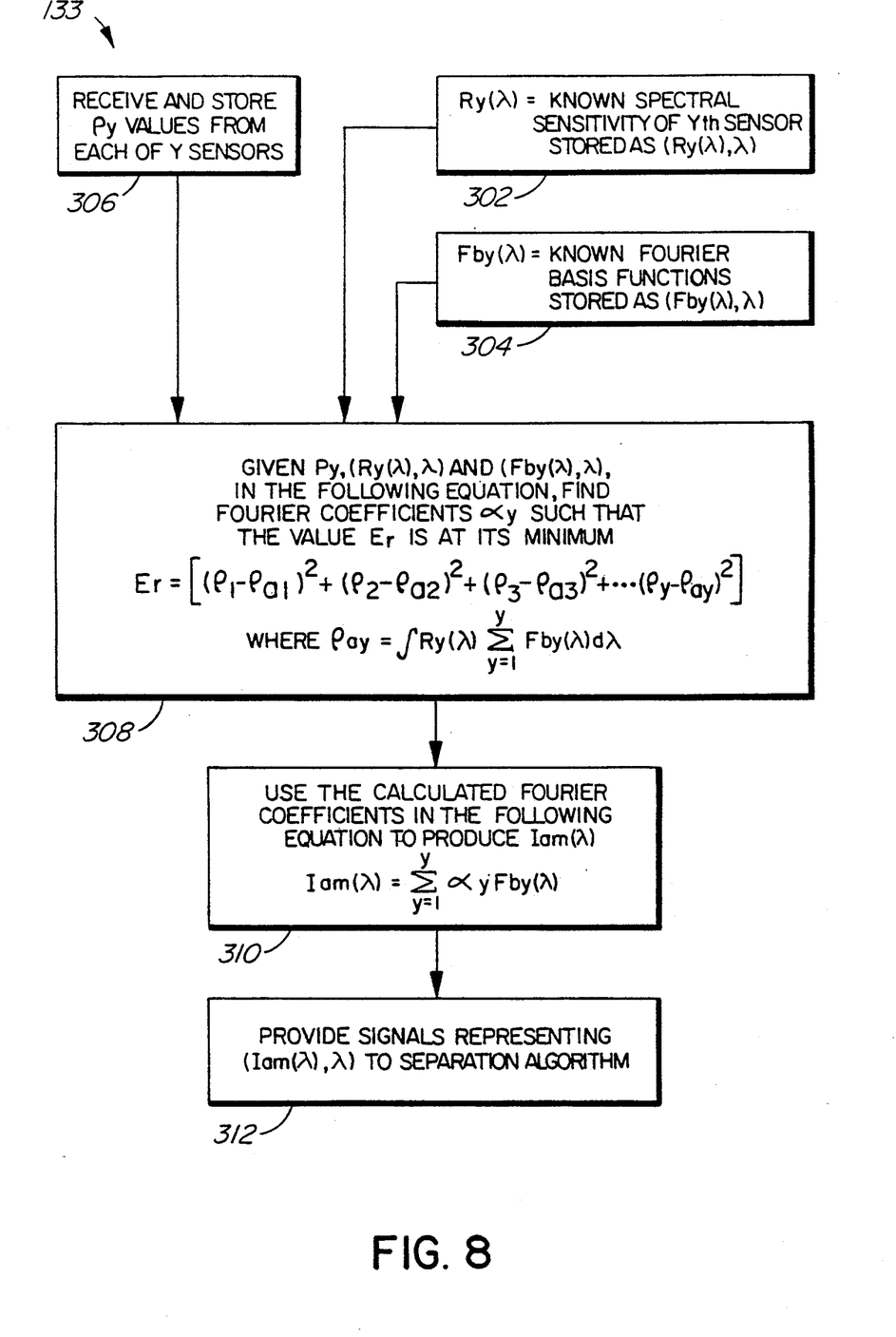
FIG. 8 is a simplified flowchart of an approximation algorithm according to the second embodiment of the invention.

In this embodiment the spectral sensitivity, $R_y(\lambda)$, for each sensor is illustrated as item 302 in FIG. 8. In this example, the sensors have respective broadband spectral sensitivities corresponding generally to the colours red, green and blue. The sensors provide first, second and third electrical sensor signals 125, 127, 129 representing scalar numerical values corresponding to the intensity of the colours red, green and blue respectively in the reflected light 118.

The first, second and third electrical sensor signals 125, 127 and 129 are supplied to a computer 122 programmed with the applications program 126 as illustrated by 306 in FIG. 8. The applications program is similar to program 26 described in the first embodiment except that in addition to a separation algorithm 128 and basis function libraries 130 and 132, the program includes an illumination approximation algorithm 133. Under the illumination approximation algorithm the program 126 processes the sensor signals 125, 127, 129 to produce data signals on wires 124, the signals representing a measured spectral power distribution $Im(\lambda)$ of the reflected light 118.

The program acts to generate a Fourier weighting coefficient $a_y$ for each of Y Fourier basis functions $Fb_y(\lambda)$ 304 for describing an approximation $Iam(\lambda)$ to the measured spectral power distribution $Im(\lambda)$ of the reflected light 118 according to the relation:

$$Iam(\lambda) = \sum_{y=1}^{Y} a_y Fb_y(\lambda)$$

The Fourier coefficients are generated by using the above relation to generate approximations to the numerical values produced by each of the sensors, the approximations being generated by the relation:

$$\rho ay = \int R_y(\lambda) \, Iam(\lambda) \, d\lambda$$

$$\rho_{ay} = \int R_y(\lambda) Iam(\lambda) d\lambda$$
$$= \int R_y(\lambda) \sum_{y=1}^{Y} a_y Fb_y(\lambda) d\lambda$$

Task 308 illustrates that each sensor approximation $\rho_{ay}$ is then compared to the actual values produced by the sensors, and the squares of the differences between each approximation and actual sensor values are summed to produce an error value according to the relation:

$$Er = [(\rho_1 - \rho_{a1})^2 + (\rho_2 - \rho_{a2})^2 + (\rho_3 - \rho_{a3})^2 \ldots (\rho_y - \rho_{ay})^2]$$

Numerical methods are used to choose Fourier coefficients such that the error in the above relation is set to a minimum. In task 310, the Fourier coefficients which satisfy these criteria are then used in conjunction with the Fourier basis functions $Fb_y(\lambda)$ according to the relation:

$$Iam(\lambda) = \sum_{y=1}^{Y} a_y Fb_y(\lambda)$$

The data signals 124 represent Iam(λ) as a plurality of light intensity samples taken at L wavelengths. At task 312, the signals are passed to the separation algorithm 128 and are interpreted as Im(λ) samples such as supplied by the spectrometer described in the first embodiment. The Iam(λ) samples are then used by the separation algorithm to determine the illumination signals and the reflectance signals as described in connection with the first embodiment. These signals appear on wires 142 and 144 respectively. The signals may then be used with an interface 134 and a video display terminal 136 as described in connection with the first embodiment.

While specific embodiments of the invention have been described, such embodiments should be considered illustrative of the invention only and not as limiting the scope of the invention as construed in accordance with the accompanying claims.

What is claimed is:

1. An apparatus for dividing light reflected by an illuminated surface into constituent parts of illuminating light and surface spectral reflectance of the surface, the apparatus comprising:

(a) means for receiving spectral power distribution signals produced by performing a band-limited spectral analysis of light reflected by said illuminated surface, said spectral power distribution signals representing measured spectral power distribution Im(λ) of the light reflected by the illuminated surface;

(b) data processing means for:

generating a weighting coefficient $\epsilon_i$ for each of M illuminant basis functions $Eb_i(\lambda)$ describing the illuminating light, said processing means generating a weighting coefficient $\sigma_j$ for each of N reflectance basis functions $Sb_j(\lambda)$ describing the reflectance of the surface, said processing means comparing an approximation Ia(λ) of the measured power distribution Im(λ), to the measured spectral power distribution Im(λ), Ia(λ) being defined by the relation:

$$Ia(\lambda) = \left( \sum_{i=1}^{M} \epsilon_i Eb_i(\lambda) \right) \left( \sum_{j=1}^{N} \sigma_j Sb_j(\lambda) \right)$$

the set of product pairs $Eb_i(\lambda)Sb_j(\lambda)$ being forming a linearly independent set, said processing means regenerating different weighting coefficients until said Ia(λ) is generally equal to said Im(λ);

said processing means generating output spectral power distribution signals representing at least one of said constituent parts of illuminating light and said surface spectral reflectance based on said weighting coefficients $\epsilon_i$ and $\sigma_j$ generated to make said Ia(λ) generally equal to Im(λ), said processing means generating said output spectral power distribution signals representing illuminating light according to the equation:

$$Ea(\lambda) = \sum_{i=1}^{M} \epsilon_i Eb_i(\lambda);$$

and said processing means generating said output spectral power distribution signals representing surface spectral reflectance according to the equation:

$$Sa(\lambda) = \sum_{j=1}^{N} \sigma_j Sb_j(\lambda)$$

where $\epsilon_i$ and $\sigma_j$ are coefficients for which the approximation Ia(λ) is generally equal to said Im(λ).

2. An apparatus as claimed in claim 1 wherein the processing means includes a programmable data processor programmed to generate the illuminant basis function weighting coefficients $\epsilon_i$ and the reflectance basis function weighting coefficients $\sigma_j$ in an iterative process, initial values of the illuminant basis function weighing coefficients being pre-determined, said iterative process solving for the reflectance basis function weighting coefficients $\sigma_j$ by employing following equation (1):

EQUATION (1)
$$\sum_{l=1}^{L} Sb_k(\lambda_l) \left( \sum_{i=1}^{M} \epsilon_i Eb_i(\lambda_l) \right) *$$

$$\left[ \left( \sum_{i=1}^{M} \epsilon_i Eb_i(\lambda_l) \right)\left( \sum_{j=1}^{N} \sigma_j Sb_j(\lambda_l) \right) - Im(\lambda_l) \right] = 0$$

for $k = 1$ to $N$ and solving for the illuminant basis function weighting coefficients $\epsilon_i$, by employing following second equation (2):

EQUATION (2)
$$\sum_{l=1}^{L} Eb_k(\lambda_l) \left( \sum_{j=1}^{N} \sigma_j Sb_j(\lambda_l) \right) *$$

$$\left[ \left( \sum_{i=1}^{M} \epsilon_i Eb_i(\lambda_l) \right)\left( \sum_{j=1}^{N} \sigma_j Sb_j(\lambda_l) \right) - Im(\lambda_l) \right] = 0$$

for $k = 1$ to $M$ where L = the number of spectral power distribution samples received by the receiving means.

3. An apparatus as claimed in claim 1 further including a video display terminal for displaying at least one representation of said surface spectral reflectance and said illuminating light.

4. An apparatus as claimed in claim 1 further including means for producing spectral power distribution signals representing the measured spectral power distribution of light reflected by the surface, the measured spectral power distribution Im(λ) being represented as a plurality of spectral power distribution samples Im at a corresponding plurality of wavelengths λ and the means for producing providing said spectral power distribution signals to said means for receiving spectral power distribution signals.

5. An apparatus as claimed in claim 4 wherein the means for producing spectral power distribution signals includes a spectrometer.

6. An apparatus as claimed in claim 4 wherein the means for producing signals includes a plurality of sensors including a number Y of sensors for receiving light reflected by the illuminated surface.

7. An apparatus as claimed in claim 6 wherein each sensor produces a respective sensor signal $\rho_y$ responsive to the intensity and spectral content of reflected light according to the relation:

$$\rho_y = \int R_y(\lambda) I(\lambda) d(\lambda)$$

Where:
$R_y(\lambda)$ is the spectral sensitivity of the yth sensor as a function of $(\lambda)$; and
$I(\lambda)$ is the intensity of the light reflected by the illuminated surface as a function of $(\lambda)$.

8. An apparatus as claimed in claim 7 wherein the producing means includes illumination approximation means for receiving the sensor signals $\rho_y$ and for producing spectral power distribution signals representing an approximation $Iam(\lambda)$ to the measured spectral power distribution $Im(\lambda)$ of light reflected by the illuminated surface.

9. An apparatus as claimed in claim 8 wherein the illumination approximation means has a plurality of basis functions $Fb_y(\lambda)$ stored therein and generates a weighting coefficient $a_y$ for each of Y basis functions $Fb_y(\lambda)$ for describing the approximation $Iam(\lambda)$ to the measured spectral power distribution.

10. An apparatus as claimed in claim 9 wherein the basis functions $Fb_y(\lambda)$ are Fourier basis functions and the weighting coefficients $a_y$ are Fourier coefficients.

11. An apparatus as claimed in claim 9 wherein the approximation $Iam(\lambda)$ to the measured spectral power distribution $Im(\lambda)$ is described according to the relation:

$$Iam(\lambda) = \sum_{y=1}^{Y} a_y Fb_y(\lambda).$$

12. A method of dividing light reflected by an illuminated surface into constituent parts of the illuminating light and surface spectral reflectance of the surface, the method comprising the steps of:
(i) receiving spectral power distribution signals produced by performing a band-limited spectral analysis of light reflected by said illuminated surface, said spectral power distribution signals representing measured spectral power distribution $Im(\lambda)$ of the light reflected by the illuminated surface;
(ii) generating a weighting coefficient $\epsilon_i$ for each of M illuminant basis functions $Eb_i(\lambda)$ describing the illuminating light;
(iii) generating a weighting coefficient $\sigma_j$ for each of N reflectance basis functions $Sb_j(\lambda)$ describing the reflectance of the surface;
(iv) comparing an approximation $Ia(\lambda)$ of the measured spectral power distribution $Im(\lambda)$, to the measured spectral power distribution $Im(\lambda)$, $Ia(\lambda)$ being defined by the relation:

$$Ia(\lambda) = \left( \sum_{i=1}^{M} \epsilon_i Eb_i(\lambda) \right) \left( \sum_{j=1}^{N} \sigma_j Sb_j(\lambda) \right)$$

the set of product pairs $Eb_i(\lambda) Sb_j(\lambda)$ forming a linearly independent set,
(v) re-generating different weighting coefficients until said $Ia(\lambda)$ is generally equal to said $Im(\lambda)$; and
(vi) generating output spectral power distribution representing at least one of said constituent parts of illuminating light and said surface spectral reflectance based on said weighting coefficients $\epsilon_i$ and $\sigma_j$ when said approximation $Ia(\lambda)$ and said spectral power distribution $Im(\lambda)$ are generally equal, said processing means generating said output spectral power distribution signals representing illuminating light according to the equation:

$$Ea(\lambda) = \sum_{i=1}^{M} \epsilon_i Eb_i(\lambda);$$

and said processing means generating said output spectral power distribution signals representing surface spectral reflectance according to the equation:

$$Sa(\lambda) = \sum_{j=1}^{N} \sigma_j Sb_j(\lambda)$$

where $\epsilon_i$ and $\sigma_j$ are coefficients for which the approximation $Ia$ is generally equal to $Im(\lambda)$.

13. A method as claimed in claim 12 wherein the illuminant basis function weighting coefficients $\epsilon_i$ and the reflectance basis function weighting coefficients $\sigma_j$ are generated in an iterative process, initial values of the illuminant basis function weighting coefficients being predetermined, said iterative process solving for the reflectance basis function weighting coefficients $\sigma_j$ by employing equation (1) as follows:

EQUATION (1)

$$\sum_{l=1}^{L} Sb_k(\lambda_l) \left( \sum_{i=1}^{M} \epsilon_i Eb_i(\lambda_l) \right) *$$

$$\left[ \left( \sum_{i=1}^{M} \epsilon_i Eb_i(\lambda_l) \right) \left( \sum_{j=1}^{N} \sigma_j Sb_j(\lambda_l) \right) - Im(\lambda_l) \right]$$

for $k = 1$ to $N$ and
solving for the illuminant basis function weighting coefficients $\epsilon_i$, by employing equation (2) as follows:

EQUATION (2)

$$\sum_{l=1}^{L} Eb_k(\lambda_l) \left( \sum_{j=1}^{N} \sigma_j Sb_j(\lambda_l) \right) *$$

$$\left[ \left( \sum_{i=1}^{M} \epsilon_i Eb_i(\lambda_l) \right) \left( \sum_{j=1}^{N} \sigma_j Sb_j(\lambda_l) \right) - Im(\lambda_l) \right] = 0.$$

for $k = 1$ to $M$

14. A method as claimed in claim 12 further including the step of outputting one of the illuminating light signals and the surface spectral reflectance signals to a video display terminal.

15. A method as claimed in claim 12 further including producing spectral power distribution signals representing the measured spectral power distribution of light reflected by the surface, the measured spectral power distribution $Im(\lambda)$ being represented as a plurality of spectral power distribution samples $Im$ at a corresponding plurality of wavelengths $(\lambda)$.

16. A method as claimed in claim 15 wherein the signals representing the measured spectral power distribution of light reflected by the surface are produced by a spectrometer.

17. A method as claimed in claim 15 wherein the step of producing signals includes using a plurality of sensors, said plurality including a number Y of sensors for receiving light reflected by the illuminated surface.

18. A method as claimed in claim 17 wherein each sensor produces a respective sensor signal $\rho_y$ responsive to the intensity and spectral content of reflected light according to the relation:

$$\rho_y = \int R_y(\lambda) I(\lambda) d\lambda$$

Where:

$R_y(\lambda)$ is the spectral sensitivity of the yth sensor as a function of $\lambda$; and $I(\lambda)$ is the intensity of the light reflected by the illuminated surface as a function of $\lambda$.

19. A method as claimed in claim 18 further including the steps of receiving the sensor signals $\rho_y$ and producing data signals representing an approximation Iam($\lambda$) to the measured spectral power distribution Im($\lambda$) of light reflected by the illuminated surface.

20. A method as claimed in claim 19 further including the step of determining a weighting coefficient $\alpha_y$ for each of Y basis functions $Fb_y(\lambda)$ for describing the approximation Iam to the measured spectral power distribution.

21. A method as claimed in claim 20 wherein the basis functions $Fb_y(\lambda)$ are Fourier basis functions and the weighting coefficients $\alpha_y$ are Fourier coefficients.

22. A method as claimed in claim 20 wherein the approximation Iam($\lambda$) to the measured spectral power distribution Im($\lambda$) is described according to the relation:

$$Iam(\lambda) = \sum_{y=1}^{Y} \alpha_y Fb_y(\lambda).$$

23. A method as claimed in claim 20 wherein said data signals are produced by finding coefficients $\alpha_y$ such that the first following equation (1) is at its minimum and using said coefficients $\alpha_y$ in the second following equation (2) to represents Iam($\lambda$), said Iam($\lambda$) being represented as a plurality of spectral power distribution samples Im at a corresponding plurality of wavelengths ($\lambda$):

$$Er = [(\rho_1 - \rho_{a1})^2 + (\rho_2 - \rho_{a2})^2 + (\rho_3 - \rho_{a3})^2 \ldots (\rho_y - \rho_{ay})^2] \quad (1)$$

Where:

$$\rho_{ay} = \int R_y(\lambda) Iam(\lambda) d\lambda$$

$$Iam(\lambda) = \sum_{y=1}^{Y} \alpha_y Fb_y(\lambda). \quad (2)$$

24. An apparatus for dividing light reflected by an illuminated surface into constituent parts of the illuminating light and surface spectral reflectance of the surface, the apparatus comprising:

(a) data processing means for:
(i) receiving spectral power distribution signals representing measured spectral power distribution Im($\lambda$) of the light reflected by the illuminated surface;

(ii) generating a weighting coefficient $\epsilon_i$ for each of M illuminant basis functions $Eb_i(\lambda)$ describing the illuminating light;

(iii) generating a weighting coefficient $\sigma_j$ for each of N reflectance basis functions $Sb_j(\lambda)$ describing the reflectance of the surface;

(iv) comparing an approximation Ia($\lambda$) of the measured spectral power distribution Im($\lambda$), to the measured spectral power distribution Im($\lambda$), Ia($\lambda$) being defined by the relation:

$$Ia(\lambda) = \left( \sum_{i=1}^{M} \epsilon_i Eb_i(\lambda) \right) \left( \sum_{j=1}^{N} \sigma_j Sb_j(\lambda) \right)$$

the set of product pairs $Eb_i(\lambda) Sb_j(\lambda)$ forming a linearly independent set, (v) re-generating different weighting coefficients until said Ia($\lambda$) is generally equal to said Im($\lambda$); and (vi) generating output spectral power distribution signals representing at least one of said constituent parts of illuminating light and said surface spectral reflectance based on said weighting coefficients $\epsilon_i$ and $\sigma_j$ when said approximation Ia($\lambda$) and said spectral power distribution Im($\lambda$) are generally equal, said processing means generating said output spectral power distribution signals to the equation:

$$Ea(\lambda) = \sum_{i=1}^{M} \epsilon_i Eb_i(\lambda);$$

said processing means generating said output spectral power distribution signals representing surface spectral reflectance $$Sa(\lambda) = \sum_{j=1}^{N} \sigma_j Sb_j(\lambda)$$

where $\epsilon_i$ and $\sigma_j$ are coefficients for which the approximation Ia is generally equal to said Im ($\lambda$)

(b) a video display terminal for displaying at least one representation of said surface spectral reflectance and said illuminating light.

25. An apparatus for dividing light reflected by an illuminated surface into constituent parts of the illuminating light and surface spectral reflectance of the surface, the apparatus comprising:

(a) a programmed data processor programmed for:
(i) receiving spectral power distribution signals representing measured spectral power distribution Im($\lambda$) of the light reflected by the illuminated surface;

(ii) generating a weighting coefficient $\epsilon_i$ for each of M illuminant basis functions $Eb_i(\lambda)$ describing the illuminating light;

(iii) generating a weighting coefficient $\sigma_j$ for each of N reflectance basis functions $Sb_j(\lambda)$ describing the reflectance of the surface;

(iv) comparing an approximation Ia($\lambda$) of the measured spectral power distribution Im($\lambda$), to the measured spectral power distribution Im($\lambda$), Ia($\lambda$) being defined by the relation:

$$Ia(\lambda) = \left(\sum_{i=1}^{M} \epsilon_i Eb_i(\lambda)\right)\left(\sum_{j=1}^{N} \sigma_j Sb_j(\lambda)\right)$$

the set of product pairs $Eb_i(\lambda)Sb_j(\lambda)$ forming a linearly independent set;

(v) re-generating different weighting coefficients until said $Ia(\lambda)$ is generally equal to said $Im(\lambda)$; and (vi) generating output spectral power distribution signals representing at least one of said constituent parts of illuminating light and said surface spectral reflectance based on said weighting coefficients $\epsilon_i$ and $\sigma_j$ when said approximation $Ia(\lambda)$ and said spectral power distribution $Im(\lambda)$ are generally equal, said processing means generating said output spectral power distribution signals to the equation:

$$Ea(\lambda) = \sum_{i=1}^{M} \epsilon_i Eb_i(\lambda)$$

said processing means generating said output spectral power distribution signals representing surface spectral reflectance according to the equation:

$$Sa(\lambda) = \sum_{j=1}^{N} \sigma_j Sb_j(\lambda)$$

where $\epsilon_i$ and $\sigma_j$ are coefficients for which the approximation Ia is generally equal to $Im(\lambda)$ (b) a video display terminal for displaying at least one representation of said surface spectral reflectance and said illuminating light.

26. A method of operating a computer for dividing light reflected by an illuminated surface into constituent parts of the illuminating light and surface spectral reflectance of the surface, the method comprising the steps of:

(i) receiving spectral power distribution signals produced by performing a band-limited spectral analysis of light reflected by said illuminated surface, said spectral power distribution signals representing measured spectral power distribution $Im(\lambda)$ of the light reflected by the illuminated surface;

(ii) generating a weighting coefficient $\epsilon_i$ for each of M illuminant basis functions $Eb_i(\lambda)$ describing the illuminating light;

(iii) generating a weighting coefficient $\sigma_j$ for each of N reflectance basis functions $Sb_j(\lambda)$ describing the reflectance of the surface;

(iv) comparing an approximation $Ia(\lambda)$ of the measured spectral power distribution $Im(\lambda)$, to the measured spectral power distribution $Im(\lambda)$, $Ia(\lambda)$ being defined by the relation:

$$Ia(\lambda) = \left(\sum_{i=1}^{M} \epsilon_i Eb_i(\lambda)\right)\left(\sum_{j=1}^{N} \sigma_j Sb_j(\lambda)\right)$$

the set of product pairs $Eb_i(\lambda)Sb_j(\lambda)$ forming a linearly independent set, (v) re-generating different weighting coefficients until said $Ia(\lambda)$ is generally equal to said $Im(\lambda)$; and (vi) generating output spectral power distribution signals representing at least one of said constituent parts of illuminating light and said surface spectral reflectance based on said weighting coefficients $\epsilon_i$ and $\sigma_j$ when said approximation $Ia(\lambda)$ and said spectral power distribution $Im(\lambda)$ are generally equal, said processing means generating said output spectral power distribution signals representing illuminating light according to the equation:

$$Ea(\lambda) = \sum_{i=1}^{M} \epsilon_i Eb_i(\lambda)$$

said processing means generating said output spectral power distribution signals representing surface spectral reflectance according to the equation:

$$Sa(\lambda) = \sum_{j=1}^{N} \sigma_j Sb_j(\lambda)$$

Where $\epsilon_i$ and $\propto_j$ are coefficients for which the approximation Ia is generally equal to $Im(\lambda)$.

27. An apparatus for dividing light reflected by an illuminated surface into constituent parts of illuminating light and surface spectral reflectance of the surface, the apparatus comprising:

(a) means for receiving spectral power distribution signals produced by performing a band limited spectral analysis of light reflected by said illuminated surface, said spectral power distribution signals representing measured spectral power distribution $Im(\lambda)$ of the light reflected by the illuminated surface;

(b) data processing means for:

generating a weighting coefficient $\epsilon_i$ for each of M illuminant basis functions $Eb_i(\lambda)$ describing the illuminating light, by solving for $\epsilon_i$ in the following equation:

$$\sum_{l=1}^{L} Sb_k(\lambda_l)\left(\sum_{i=1}^{M} \epsilon_i Eb_i(\lambda_l)\right) *$$

$$\left[\left(\sum_{i=1}^{M} \epsilon_i Eb_i(\lambda_l)\right)\left(\sum_{j=1}^{N} \sigma_j Sb_j(\lambda_l)\right) - Im(\lambda_l)\right] = 0$$

for $k = 1$ to $N$ said processing means generating a weighting coefficient oj for each of N reflectance basis functions $Sb_j(\lambda)$ describing the reflectance of the surface, by solving for $\sigma_j$ in the following equation:

$$\sum_{l=1}^{L} Eb_k(\lambda_l)\left(\sum_{j=1}^{N} \sigma_j Sb_j(\lambda_l)\right) *$$

$$\left[\left(\sum_{i=1}^{M} \epsilon_i Eb_i(\lambda_l)\right)\left(\sum_{j=1}^{N} \sigma_j Sb_j(\lambda_l)\right) - Im(\lambda_l)\right] = 0$$

for $k = 1$ to $M$ said processing means comparing an approximation $Ia(\lambda)$ of the measured spectral power distribution $Im(\lambda)$ to the measured spectral power distribution $Im(\lambda)$, $Ia(\lambda)$ being defined by the relation:

$$Ia(\lambda) = \left(\sum_{i=1}^{M} \epsilon_i Eb_i(\lambda)\right)\left(\sum_{j=1}^{N} \sigma_j Sb_j(\lambda)\right)$$

the set of product pairs $Eb_i(\lambda)Sb_j(\lambda)$ forming a linearly independent set, said processing means regenerating different weighting coefficients until said $Ia(\lambda)$ is generally equal to said $Im(\lambda)$; and said processing means generating output spectral power distribution signals representing at least one of said constituent parts of illuminating light and said surface spectral reflectance based on said weighting coefficients $\epsilon_i$ and $\sigma_j$ generated to make said $Ia(\lambda)$ generally equal to $Im(\lambda)$, said processing means generating said output spectral power distribution signals representing illuminating light according to the equation;

$$Ea(\lambda) = \sum_{i=1}^{M} \epsilon_i Eb_i(\lambda)$$

and said illuminating light signals including a plurality of spectral power distribution samples Ea at a corresponding plurality of wavelengths ($\lambda$); and said processing means generating said output spectral power distribution signals representing surface spectral reflectance according to the equation:

$$Sa(\lambda) = \sum_{j=1}^{N} \sigma_j Sb_j(\lambda)$$

said surface spectral reflectance signals including a plurality of spectral reflectance distribution samples Sa at a corresponding plurality of wavelengths ($\lambda$).

* * * * *